United States Patent
Corvasce et al.

(10) Patent No.: US 6,843,293 B1
(45) Date of Patent: Jan. 18, 2005

(54) VARIABLE-STIFFNESS WEDGE INSERT FOR RUNFLAT TIRES

(75) Inventors: Filomeno Gennaro Corvasce, Mertzig (LU); Anne Therese Peronnet-Paquin, Luxembourg (LU); Laurent Colantonio, Bastogne (BE); Alain Emile François Roesgen, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/148,097
(22) PCT Filed: Dec. 16, 1999
(86) PCT No.: PCT/US99/30123
§ 371 (c)(1), (2), (4) Date: May 23, 2002
(87) PCT Pub. No.: WO01/43995
PCT Pub. Date: Jun. 21, 2001

(51) Int. Cl.⁷ .......................... B60C 17/00; B60C 17/04; B60C 9/00
(52) U.S. Cl. ...................... 152/516; 152/517; 152/525; 152/555
(58) Field of Search ................................. 152/516, 517, 152/555

(56) References Cited

U.S. PATENT DOCUMENTS 4,287,924 A  9/1981  Deck et al.
4,779,658 A  10/1988  Kawabata et al.
5,058,646 A * 10/1991  Kajikawa et al. ............ 152/454
5,368,082 A  11/1994  Oare et al.
5,413,160 A *  5/1995  Giuliano ...................... 152/458
5,427,166 A   6/1995  Willard, Jr.
5,511,599 A   4/1996  Willard, Jr.
6,422,279 B1 *  7/2002  Williams et al. ............. 152/517

FOREIGN PATENT DOCUMENTS

EP  0475258     3/1992
FR  2132836  * 10/1972

* cited by examiner

Primary Examiner—Blaine Copenheaver
Assistant Examiner—Justin Fischer
(74) Attorney, Agent, or Firm—Howard M. Cohn (57) ABSTRACT

A pneumatic radial ply tire (86, 104) having a tread (106), a carcass (96, 108) with two sidewalls (88a, 88b, 116a, 116b), a radial ply structure (98, 110), and a belt structure (103, 117) located radially between the tread and the radial ply structure. Each sidewall is reinforced with at least one wedge insert (89a, 89b, 118a, 118b, 120a, 120b) which comprises alternating regions (90a, 90b, 122a, 122b) of flexible material and layers (91a, 91b, 124a, 124b) of stiffer material. The layer (91a, 91b, 124a, 124b) of stiffer material constrain the lateral expansion of the wedge insert (89a, 89b, 118a, 118b, 120a, 120b) during runflat operation to provide good riding comfort during normal inflation operation and good sidewall reinforcement during runflat operation.

17 Claims, 7 Drawing Sheets

VARIABLE-STIFFNESS WEDGE INSERT FOR RUNFLAT TIRES

TECHNICAL FIELD

This invention relates to pneumatic radial-ply tires and in particular to radial-ply runflat tires.

BACKGROUND OF THE INVENTION

Various methods have been devised for enabling the safe continued operation of unpressurized or underpressurized vehicle tires with the intent of minimizing further damage to the uninflated tire and without compromising vehicle handling while driving to where the tire can be changed. Loss of tire pressure can result from a variety of causes, including puncture by a foreign object such as a nail. Pneumatic tires designed for sustained operation when "uninflated" ("flat") or underinflated are also called runflat tires, as they are capable of being driven in the "flat" condition. They are also called extended mobility technology tires, or EMT tires. A conventional pneumatic tire will collapse upon itself when it is uninflated and carrying the weight of a vehicle. The tire's sidewalls buckle outward in the circumferential portion of the tire where the tread contacts the ground, making the tire "flat."

The term "runflat" is generally used to describe a tire that is designed such that the tire structure alone, and in particular the structure of the sidewalls, has sufficient strength and rigidity to support the vehicle load when the tire is operated without being inflated. The sidewalls and internal surfaces of such runflat tires or EMT tires do not collapse or buckle due to their rigidity, and the prevailing designs of such tires do not otherwise contain or use other supporting structures or devices to prevent the tire from collapsing. Examples of such other supporting structures are devices that might be contained within the tire and which experience no loading during normal inflated operation.

In general, runflat tires or EMT tires incorporate sidewalls that are thicker and/or stiffer so that the tire's load can be carried by an uninflated tire with minimum adverse effects upon the tire itself and upon vehicle handling until such reasonable time as the tire can be repaired or replaced. The typical methods used in sidewall thickening and stiffening include the incorporation of circumferentially disposed wedge inserts in the inner peripheral surface of the sidewall portion of the carcass, which is the region in the tire usually having the lowest resistance to deformation under vertical loading. In such runflat tire designs, each sidewall is thickened in the region between the bead and the tread shoulder. The wedge inserts in each sidewall are generally crescent-shaped in cross-sectional view, in order to conform to the shape of the sidewalls. Such wedge reinforced sidewalls, when operated in the uninflated condition, experience a net compressive load in the region of the sidewall that is closest to the road-contacting portion of the tread. More specifically, the bending stresses on the sidewalls are such that the axially outwardmost portions of the reinforced sidewalls experience tensile stresses while the axially inward portions experience compressive stresses during runflat operation.

A Goodyear patent U.S. Pat. No. 5,368,082 ('082), by Oare et al, discloses a low aspect ratio runflat pneumatic radial ply tire which employs multiple wedge inserts in each sidewall to improve runflat stiffness. Approximately six additional pounds of weight per tire was required to support an 800 lb. load in this uninflated tire. This earlier invention, although superior to prior attempts at runflat tire design, still imposed a weight penalty which could, however, be partially offset by the elimination of a spare tire and the tire jack. However, this weight penalty becomes even more problematic in the design of tires having higher aspect ratios. The '082 patent teaches a sidewall construction for runflat tires in which the tire is constructed with two plies, an inner liner and two reinforcing wedge inserts in each sidewall. The two inserts in each sidewall are disposed such that one insert is located between the two plies while the other insert is located between the inner liner and the first or innermost ply.

Two U.S. Pat. Nos. 5,427,166 and 5,511,599 of Walter L. Willard, Jr., show Michelin tires that incorporate an additional third ply and a third insert in the sidewall to further increase the runflat performance of the tire over that of the '082 patent. These Willard patents discuss some of the load relationships that occur in the uninflated condition of the tire and demonstrate that the concept taught in the '082 patent can be applied to additional numbers of plies as well as additional wedge inserts in each sidewall.

However, such large amounts of rubber used to stiffen the sidewall members become factors in flexure heating that leads to tire failure during runflat operation. This is especially so when the tire is operated at high speeds during low or zero inflation. Therefore, one goal of runflat tire design is to minimize the number of wedge inserts used to stiffen each sidewall and the total amount of wedge insert material used in runflat tire.

While the high resistance to compression and deflection of the inserts provides the necessary resistance to the collapse of the uninflated loaded tire, the use of multiple plies and more than one reinforcing wedge insert in each sidewall has drawbacks which include the above mentioned increase in tire weight and flexure-induced heat buildup. Such designs also increase the tire's complexity in ways that adversely affect manufacturing and quality control.

Clearly, the goal in runflat tire design is to provide a low-cost, light-weight tire that gives both good runflat vehicle handling as well as good service life during runflat operation.

SUMMARY OF THE INVENTION

The present invention relates to a pneumatic radial ply runflat tire having a tread, a carcass including a radial ply structure and two sidewalls each reinforced by one or more reinforcing wedge inserts. Each reinforcing wedge insert is constructed of two or more different materials providing a structural moment of inertia that increases with increased compressions of the sidewalls.

One or more of the one or more reinforcing wedge inserts in each sidewall can include a plurality of radially-layered, circumferentially disposed regions of a first flexible, low-hysteresis material separated by one or more circumferentially disposed layers of a second material that is stiffer than the first material.

The regions of flexible, low-hysteresis material have a hardness of between 45 and 70 on the Shore A scale and the layers of stiffer material have a hardness that is between slightly more than that of the flexible low-hysteresis material to totally rigid.

In one embodiment, the radially-layered, circumferentially disposed regions of flexible, lowhysterisis compound and the layers of a second stiffer material are both triangularly shaped in cross section. The radially alternating, circumferentially disposed and triangularly shaped regions of flexible, low-hysteresis material and the intervening circumferentially disposed triangularly shaped layers of stiffer material can be disposed such that one vertex of each triangularly shaped region of flexible, low-hysteresis material is oriented axially inward toward the tire's equatorial plane and one vertex of each circumferentially disposed, triangularly shaped alternating layer of rigid material can be oriented axially outward from the tire's equatorial plane.

In a tire in which each sidewall has two inserts, the two axially-inner inserts can be composite (i.e. of layered flexible regions and stiffer regions) but not the outer inserts. Alternatively, the outer inserts to be composite and not the inner inserts, or, alternatively, both the inner inserts and the outer inserts to be composite.

Other benefits and advantages of the invention will become apparent to those skilled in the art to which it pertains upon a reading and understanding of the following detailed specification.

BRIEF DESCRIPTION OF THE DRAWINGS

The structure, operation, and advantages of the invention will become further apparent upon consideration of the following description taken in conjunction with the accompanying drawings, wherein.

DEFINITIONS

"Apex" means an elastomeric filler located radially above the bead core and between the plies and the turnup plies.

"Aspect Ratio" means the ratio of the section height of a tire to its section width; also refers to the cross-sectional profile of the tire; a low-profile tire, for example, has a low aspect ratio.

"Axial" and "Axially" means the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcement Belts" or "Belt Package" means at least two annular layers or plies of parallel cords, woven or unwoven, underlying the tread, unanchored to the bead, and having both left and right cord angles in the range from 18 to 30° relative to the equatorial plane of the tire.

"Carcass" means the tire structure apart from the belt structure, tread, and underbred over the plies, but including the beads.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Equatorial Plane" means the plane perpendicular to the tire's axis of rotation and passing through the center of its tread; or the plane containing the circumferential centerline of the tread.

"EMT tire" means "extended mobility technology tire," which means the same as "runflat tire."

"Inner liner" means the layer or layers of elastomer or other material that form the inside surface of a tubeless tire and that contain the inflating fluid within the tire.

"Insert" means the same as "wedge insert," which is the crescent- or wedge-shaped reinforcement typically used to reinforce the sidewalls of runflat-type tires; it also refers to the elastomeric non-crescent-shaped insert that underlies the tread.

"Lateral" means a direction parallel to the axial direction.

"Moment of inertia" or "structural moment of inertia" refers to the structural rigidity of a beam section or other structure such as, specifically, the sidewall of a tire. A structure, such as a tire sidewall, having a high moment of inertia is more rigid than a similar structure having a lower moment of inertia.

"Normal load" means the specific design inflation pressure and load assigned by the appropriate standards organization for the service condition for the tire.

"Ply" means a cord-reinforced layer of rubber-coated radially deployed, parallel cords.

"Radial" and "radially" mean directions radially toward or away from the axis of rotation of the tire.

"Radial ply structure" means the one or more carcass plies or which at least one ply has reinforcing cords oriented at an angle of between 65 and 90 with respect to the equatorial plane of the tire.

"Radial ply tire" means a belted or circumferentially-restricted pneumatic tire in which at least one ply has cords which extend from bead to bead are laid at cord angles between 65° and 90° with respect to the equatorial plane of the tire.

"Runflat" or "runflat tire" is a pneumatic tire that is designed to provide limited service while uninflated or underinflated.

"Section height" means the radial distance from the nominal rim diameter to the outer diameter of the tire at its equatorial plane.

"Section width" means the maximum linear distance parallel to the axis of the tire and between the exterior of its sidewalls when and after the tire has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Wedge insert" means the same as "insert," which is the sidewall reinforcement used in runflat tires.

DETAILED DESCRIPTION OF THE PREFERRED EMBODIMENT

Prior Art Embodiment

Figure 1:
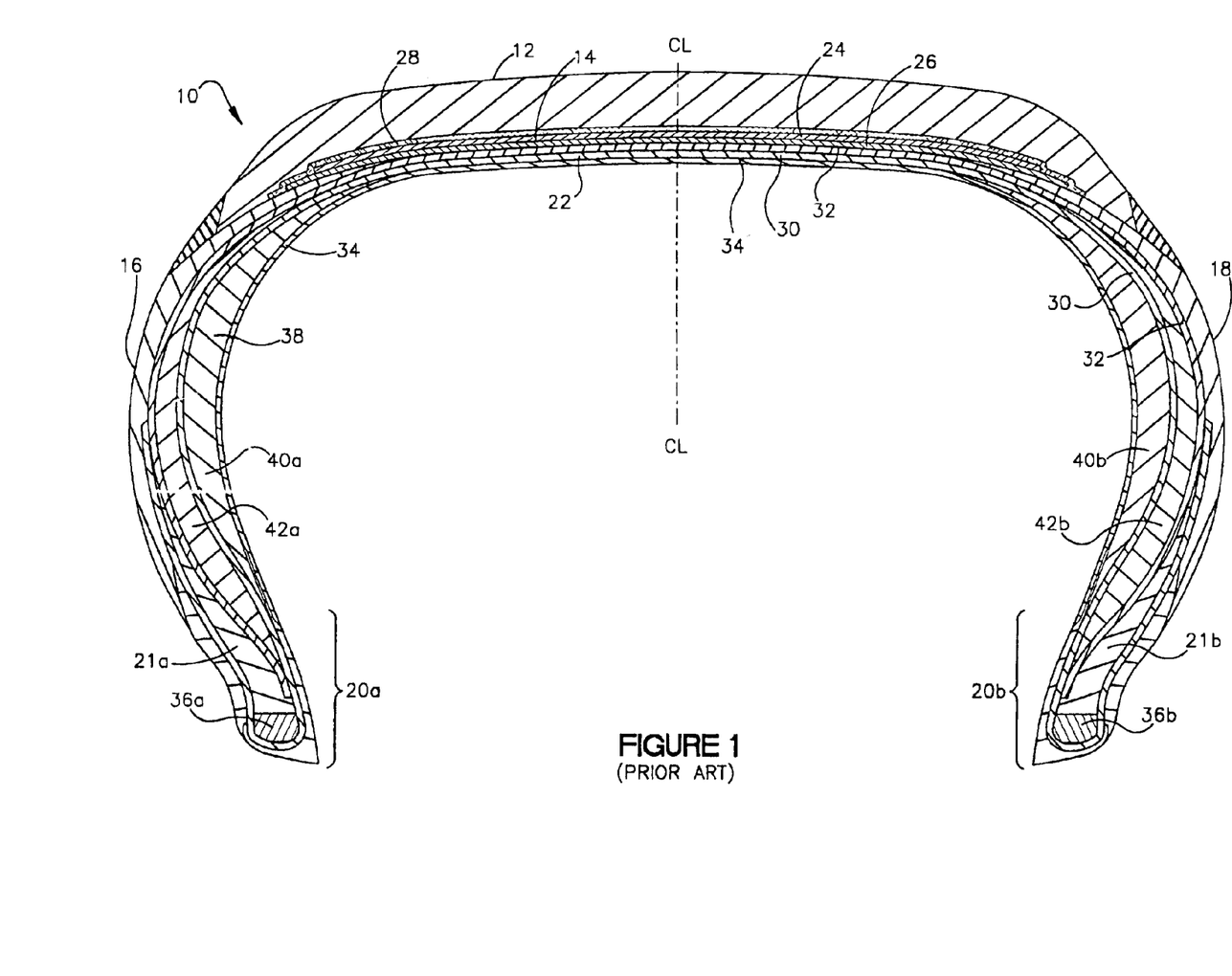
FIG. 1 is a cross-sectional view of a prior art runflat tire design incorporating multiple wedge inserts in each sidewall and multiple plies in the ply structure.

With reference to FIG. 1, a cross section of a typical prior art pneumatic radial runflat tire 10 is illustrated. The tire to has a tread 12, a belt structure 14 comprising belts 24,26, a pair of sidewalls 16,18, a pair of bead regions 20a,20b and a carcass structure 22. The carcass 22 comprises a first ply 30 and second ply 32, and a gas-impervious inner liner 34. The bead regions 20a,20b comprise a pair of beads 36a,36b, and a pair of bead filler apexes 21a,21b. The sidewalls 16,18 each contain a first pair of axially innermost sidewall wedge inserts 40a,40b, and a second pair of axially outermost inserts 42a,42b. The innermost wedge inserts 40a,40b are disposed between the inner liner 34 and the first ply 30, while the second wedge inserts 42a,42b are disposed between the first ply 30 and the second ply 32. A fabric overlay 28 is deployed beneath, or radially inward of, tread 12 and on top of, or radially outward from, belt structure 14. The wedge inserts 40a,40b,42a,42b impart to the sidewalls a greater structural moment of inertia, or rigidity, for resisting the deformations imposed upon the sidewalls during runflat operation. Thus the reinforced sidewall portions 16,18 of carcass structure 22 give the tire 10 a limited runflat capability.

As can be seen from FIG. 1, the structural reinforcement in the sidewall areas of the tire 10 substantially increases the overall thickness of the sidewall portions 16,18. This generalized prior art runflat tire design shows the more or less uniformly thickened sidewalls that characterize runflat tire designs. The insert-reinforced sidewalls are designed to support the tire's load with minimal sidewall deflection when the tire 10 is in an uninflated state. Such a runflat tire design provides good vehicle handling and performance under conditions of full inflation, and it provides acceptable runflat vehicle handling and a limited runflat operational life when the tire is uninflated.

Such a rigid-sidewall runflat tire design provides, however, a rough ride during normal-inflated operation due to the greater stiffness of the sidewalls. The greater stiffness arises, of course, due to the increased structural moment of inertia, or rigidity, of the sidewalls, due to the presence of the wedge inserts. More ideally, the sidewalls of a runflat tire should be more flexible during normal-inflated operation than during runflat operation when the additional rigidity is important.

Basic Principle of the Present Invention

The present invention provides a wedge insert that is designed to be flexible during normal inflated operation and more rigid during runflat operation. Two related methods to achieve this goal are used. Both involve alternating layers of rigid and flexible elastomeric material in the wedge insert.

In one method, the tendency of the wedge insert material to expand axially when it is compressed radially is inhibited by the incorporation of circumferentially disposed layers of relatively rigid material, such as a relatively rigid elastomer (i.e. elastic polymer material) or totally rigid plastic, within a more flexible material, such as a more flexible elastomer, that makes up the bulk of the wedge insert. Such inhibition of the axial expansion increases the rigidity of the wedge insert when it is subjected to the radial compressive loading associated with sidewall flexure during runflat operation. Thus, the sidewall-reinforcing wedge inserts become more rigid during runflat operation than they are during normal-inflated operation. In the second method, segments of relatively rigid material, such as a relatively rigid elastomer, that are triangular in cross-section are circumferentially disposed within the wedge insert, alternating with segments of more flexible material, such as a relatively rigid elastomer, that are also triangular in cross-section and circumferentially disposed within the wedge insert. In this later method, the relatively rigid segments inhibit the axial expansion of the wedge insert when it is subjected to the radial compressive loads associated with runflat operation. In addition, the geometry of the design, which is explained in detail below, allows the relatively rigid portions (or segments) to contribute an increased moment of inertia, during runflat operation. Both methods operate in such a way that, in effect, the bending moment of inertia of the wedge-insert-reinforced sidewalls increases as the sidewalls deflect under the cyclical axial loading associated with runflat operation.

The principle of the present invention is explained in more detail below.

Compression Stresses in Runflat Tire Sidewalls

Figure 2A:
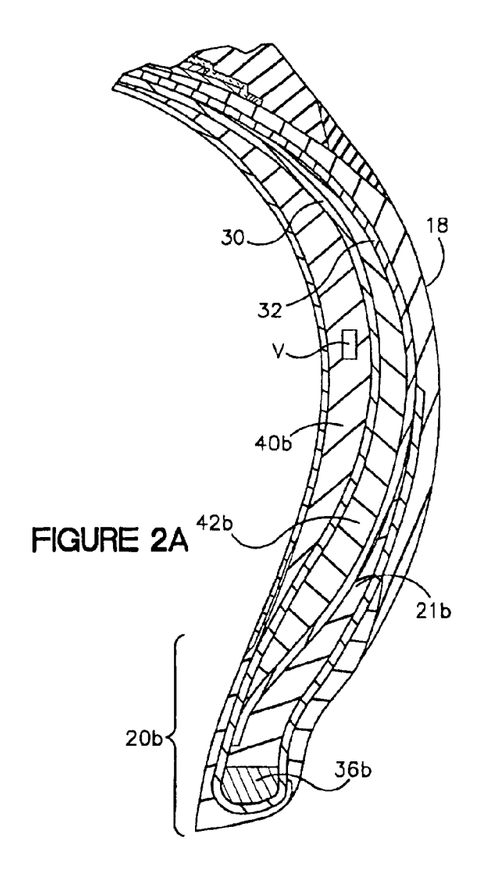
FIG. 2A shows a sidewall segment in a wedge insert of the prior art tire shown in FIG. 1.

FIG. 2A shows a cross-sectional view of the sidewall 18 of the tire 10 of FIG. 1. The discussion below assumes that the same effects can be found in sidewall 16 as in sidewall 18. During runflat operation, the portion of the sidewall most immediately adjacent to the ground-contacting portion of the tread undergoes a net radially directed compressive loading which, in the view shown in FIG. 2A, has a vertical orientation. Such compressive loading of each sidewall 16,18 (FIG. 1) and its respective reinforcing wedge inserts 40a,40b,42a,42b causes the sidewalls to bend axially outward so that, as viewed in FIG. 2A, the axially innermost portions of the sidewall, including most if not all of the wedge insert 40b, is subjected to radially directed compressive stress while the axially outermost portions of the sidewall, including most if not all of the wedge insert 42b, undergoes a radially directed corresponding tensile stress. In other words, while the net loading of the sidewall is compressive, the bending forces that act within each sidewall induce tensile stresses on one side of a neutral bending axis and compressive stresses on the other side of the same neutral bending axis. The neutral bending axis lies somewhere within the sidewall structure at a location which, for purposes of explaining this invention, can be assumed to lie near the middle of the cross-sectional view of the sidewall depicted in FIG. 2A. That is, the neutral bending axis in the sidewall 18 can be taken as being coincident with the first ply 30, though in reality the precise location of the neutral bending axis is a complex function of the relative strengths and stiffnesses of the respective components of the tire's sidewalls. Thus, for the sake of simplifying the description of the location of the compressive forces, the inner wedge insert 40b shown in FIG. 2A can be taken as undergoing radially directed compressive stress that increases intensity with increasing distance axially inward from the first ply 30 which nominally coincides with the neutral bending axis.

In FIG. 2A a small cylindrical volume V is marked for examination of the effects of the compressive forces within the inner wedge insert 40b of the prior art tire 10 shown in FIG. 1. The cylindrical volume V is shown more specifically in FIGS. 2B and 2C. The cylindrical volume V of FIG. 2A is in a location that is loaded in radially directed compression during flexure of the sidewall 18. Such compression-inducing flexure occurs during normal inflated operation but especially during runflat operation when the magnitude of the flexure is maximum. During normal-inflated operation, the volume V, as shown in FIG. 2A, experiences cyclical compressive stresses as the tire rotates. That is, during normal-inflated operation, the material contained within the volume V experiences maximum compressive stresses when the portion of the tread that is most adjacent to the volume V is making ground contact. During runflat operation, however, the maximum compressive stresses are much greater than during the normal-inflated state. During runflat operation, the sidewall undergoes maximum bending deformation and stresses in the region of the sidewall most immediately adjacent the ground-contacting portion of the tread.

Compression-Induced Lateral Deformation

Figure 2B:
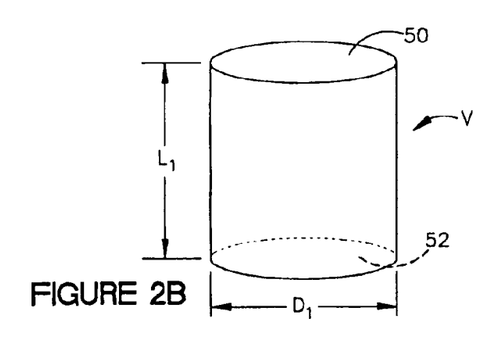
FIG. 2B is an enlargement of the segment from the tire shown in FIG. 2A.
Figure 2C:
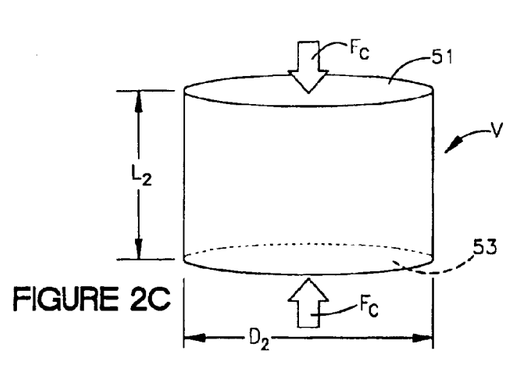
FIG. 2C shows the segment in FIG. 2B in compression.

FIG. 2B shows the cylindrical volume V of elastomeric material as taken from the approximate location shown in FIG. 2A. The cylindrical volume V of FIG. 2B has a length $L_1$ and a diameter of $D_1$. FIG. 2C shows the effects of an axially applied compressive force $F_C$ upon the diameter of the cylindrical volume V. (The term "axial" in this context refers to the axis of the cylindrical volume V, rather than to the rotational axis of the tire. Hence, the direction of the compressive force $F_C$ acting upon the cylindrical volume V is in the radial direction with respect to the tire's axis of rotation.) The diameter $D_1$ of the cylindrical volume V is smaller in FIG. 2B, where no compressive force is applied, than the maximum diameter $D_2$ of the same cylindrical volume V when the compressive force $F_C$ is applied. (The compressive force $F_C$ is assumed to act uniformly across the top and bottom surfaces 50,52, which respectively undergo increases in area to form top and bottom surfaces 51,53 as material expands laterally during compression.) FIG. 2C shows the cylindrical volume V under the influence of an axially directed compressive load $F_C$. Accordingly, the shape of the cylindrical volume V, as shown in FIG. 2C, is different from that shown in FIG. 2B. Specifically, the material of the volume V has a different length and diameter such that the length $L_2$ shown in FIG. 2C is less than the length $L_1$ of FIG. 2B and the diameter $D_2$ shown in FIG. 2C is greater than the corresponding diameter $D_1$ shown in FIG. 2B where the cylindrical volume V is not bearing a compressive load.

Thus a general property of cylindrical solids subjected to axially directed compression stresses is demonstrated in FIGS. 2B and 2C. The diameter increases as the length decreases. However, if the diameter is constrained from increasing or expanding, then the shape-deforming effects of a compressive force acting upon the volume V changes. More specifically, if the diameter is constrained from expanding during axially directed compressive loading, then the force $F_C$ will have to be increased in order to bring about a corresponding decrease in the length from $L_1$ in FIG. 2B to the shorter length $L_2$ shown in FIG. 2C. In other words, if constraints are placed upon the diametrical expansion of such a cylindrical volume V, the material within the volume V will offer increased resistance to deformation under a given compressive load $F_C$. The net effect is that the cylindrical volume V will be stiffer with respect to compressive loading.

Herein lies one part of the principle that underlies the present invention, the goal of which is to increase the rigidity of the wedge insert when it is subjected to the radially directed loading associated with runflat operation, by constraining the expansion of the more flexible material in the directions that are perpendicular to the direction of the compressive force which the wedge insert experiences most significantly during runflat operation. In other words, by constraining the expansion of the wedge insert when it is subjected to the compressive forces associated with runflat operation, the wedge insert's moment of inertia (resistance to bending deformations associated with runflat operation), increases as the deformation increases. Or, another way of looking at the action of the present invention is to say that the wedge insert, when viewed in cross-section and considered as an end-loaded curved beam, undergoes an increase in its structural moment of inertia, or resistance to bending deformation, that makes the sidewalls more rigid during runflat operation than during normal-inflated operation. This increase in structural moment of inertia of the wedge insert structure is described in further detail below. In general, however, the method of constraining such a compression-induced expansion that is lateral to the direction of the applied compressive force involves the use of novel methods. More specifically, the constraining method of the present invention is such that constraint against lateral expansion has only a small effect when the compressive forces are minimum, but an increasing constraining effect as the compressive forces increase. That is, the wedge inserts increase in stiffness directly in relation to the magnitude of the applied compressive forces.

Constraints on Expansion of Compression-Loaded Elastomers

Figure 3A:
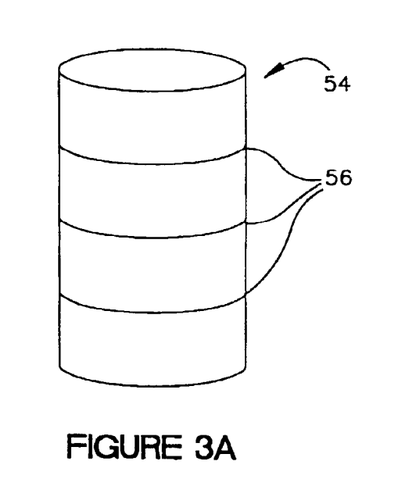
FIG. 3A shows a plan view of a solid cylinder of elastomeric material wrapped with inextensible wires.
Figure 3B:
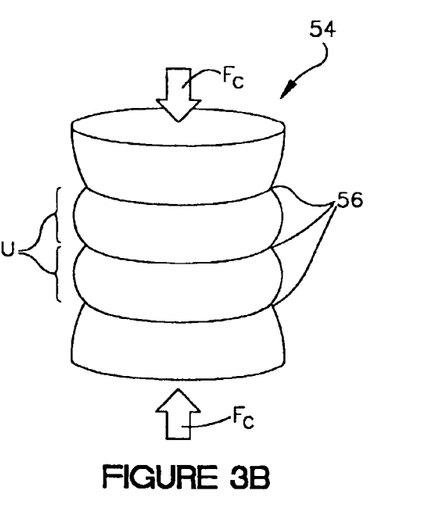
FIG. 3B shows the solid cylinder of FIG. 3A in axial compression.

Referring now to FIG. 3A, a cylindrical volume of flexible material 54, which corresponds to the volume V of FIGS. 2A through 2C, is shown wrapped with three circumferentially disposed inextensible metal constraining wires 56. FIG. 3B shows the cylinder 54 being subjected to an axially directed compressive force $F_C$. The diameter of the cylinder 54 can undergo an increase in magnitude that is greatest in those regions U that are farthest removed from the influence of the constraining wires 56.

Figure 4A:
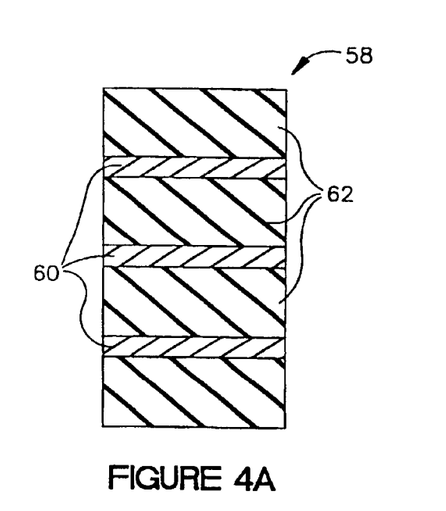
FIG. 4A is a cross-sectional view of a variation of the concept illustrated in FIG. 3A in which a cylinder of an elastomeric material incorporates the "lateral expansion constraints" as elements of the loaded member.
Figure 4B:
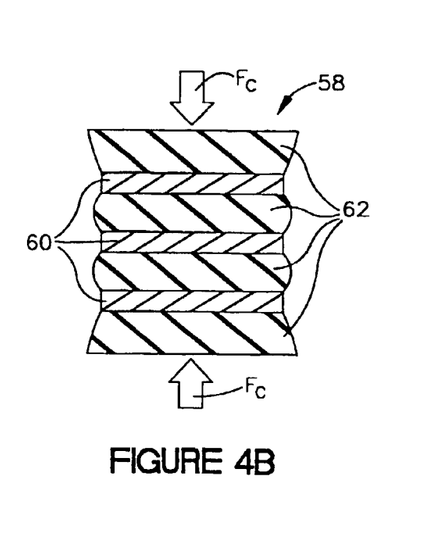
FIG. 4B shows the cylinder of FIG. 4A in axial compression.

In actual tires, however, such inextensible cylindrical constraints as those shown in FIGS. 3A and 3B are not a feasible way to constrain the expansion of a compression-loaded member such as a sidewall wedge insert reinforcement. FIG. 4A accordingly shows, in a schematic cross-sectional view, an alternative method by which to constrain the expansion of a cylindrical portion 58 of wedge insert material that is to be subjected to compressive forces. The cylindrical portion 58 comprises alternating layers of more rigid material 60 and less rigid material 62. As shown in FIG. 4B, during axially directed compression loading under a set of forces $F_C$ of the cylindrical volume 58, the more rigid (stiffer) portions 60 constrain the diametrical expansion of the less rigid portions 62. The net effect is equivalent to the use of inextensible metal constraints 56 as shown in FIGS. 3A and 3B. FIG. 4B shows the deformation that takes place when the axially directed compressive force $F_C$ is applied.

Thus, the layered composite of the sort illustrated in FIGS. 4A and 4B has the benefit of being more flexible and yielding and less rigid during small compressive loadings than during greater compressive loadings. In other words, the layered material shown in FIGS. 4A and 4B allows the combining of materials having low rigidity and hysteresis (i.e., material 62) with materials having higher rigidity and hysteresis (material 60) in ways that provide a composite material having the properties of low rigidity under conditions of low compressive loading and increasing rigidity as the compressive loading is increased. Furthermore, the low hysteresis of the more flexible material 62 has the benefit of minimizing the generation of flexural heating during cyclical compressive loading of the cylindrical portion 58. In effect, such an arrangement of materials provides a composite having a modulus of elasticity which is higher than that of the less rigid material alone, and which increases with increasing compressive force. In other words, such a composite becomes stiffer and more resistant to compression deformation as the compressive loading is increased. Or, in yet other words, not only is the stiffness of the laterally constrained material increased by the presence of layers of rigid material, but the stiffness increases as the load increases and strain increase. Therefore one gross property of such a composite construction is a compression modulus that is variable in a way that increases with strain.

Such a variable compression modulus, when applied to the construction of wedge inserts for reinforcing the side walls of runflat tires has the effect of providing to the sidewall wedge insert structures a variable moment of inertia which increases as the radially directed end-loading, compressive forces associated with runflat operation increase. The obvious benefit is that wedge-insert reinforced sidewalls comprising alternating layers of circumferentially disposed stiffer layers with intervening more flexible layers provide relatively lower rigidity during normal-inflated operation than during runflat operation. In the later condition, when the bending deformation of the sidewalls in the region most adjacent to the ground-contacting portion of the sidewall is large, as during runflat operation, the resistance of the reinforced sidewalls to bending deformation becomes greater than during normal inflated operation. Thus, this invention provides flexible riding comfort during normal-inflated operation while also providing good structural rigidity of the sidewalls during runflat operation.

Figure 5:
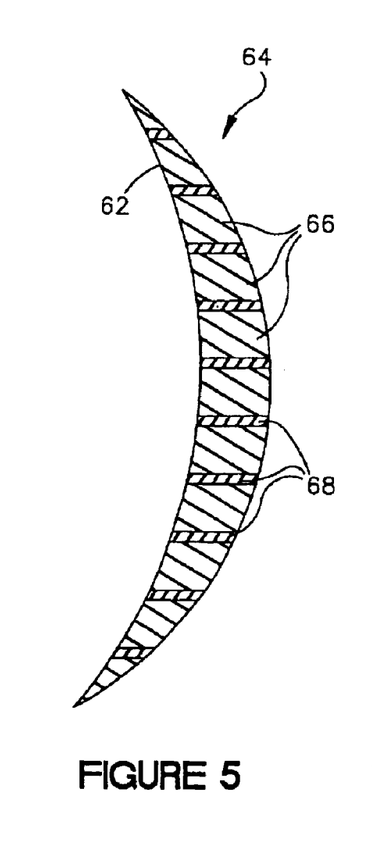
FIG. 5 is a cross-sectional view of a layered sidewall wedge insert.

FIG. 5 is a schematic view of a single sidewall wedge 64 incorporating the layered-materials principle demonstrated in FIGS. 4A and 4B. The layers 68 of more rigid material are circumferentially disposed within the circumferentially disposed wedge insert 64, intervening with the more flexible, low-hysteresis material 66. Referring to FIG. 5, more flexible, low-hysteresis material 66 gives the tire's sidewalls good flexibility during normal-inflated operation. During runflat operation, when deformation becomes most extreme, the more rigid layers 68, which constrain the expansion of the wedge insert, contribute increased rigidity to the layered composite wedge insert 64, while increasing resistance to compressive deformation. Thus the structural moment of inertia of the wedge insert, and hence of the sidewall, increases with the bending deformation. In addition, the dominant presence of low hysteresis material 66 reduces flexure-induced heating during runflat operation. Thus low hysteresis combines with high rigidity during runflat operation, yet provides flexible sidewalls during normal-inflated operation.

The sidewall reinforcing wedge insert design illustrated in FIG. 5 can be described as comprising regions 66 of flexible low-hysteresis material 62, such as elastomer (elastic polymer), separated by a multiplicity of radially disposed layers 68 of relatively rigid material from the group including fiber reinforced elastomer, thermoplastic with or without metal reinforcement, metal and metal alloy. Young's Modulus is defined as the slope of the tangent at the origin of a stress strain curve under tension or compression. The Young's Modulus of the stiffer layer 68 is 2–50,000 times that of the more flexible material 66. The more flexible material 66 has a hardness of typically between 45 and 70 on the Shore A scale, and comprises typically between 5% and 99% of the total volume of insert 64. The layers 68 of rigid material have a hardness that can be anywhere from slightly stiffer than flexible material 66 to totally rigid. The layers 68 have parallel upper and lower surfaces and are disposed circumferentially within the wedge insert. The number of layers 68 in an insert 64, and the relative thicknesses of the respective layers of stiffer layer 68 and more flexible material 66 can be selected by the tire designer so as to tailor the tire design to the final intended usage.

Figure 6A:
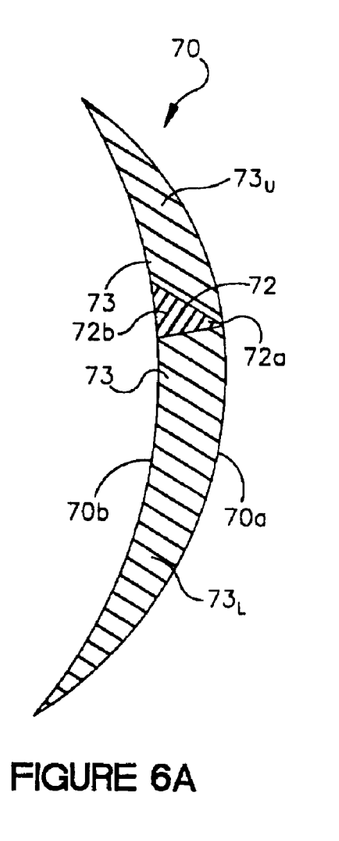
FIG. 6A is a cross-sectional view of an alternative wedge insert design principle to that of FIG. 5.
Figure 6B:
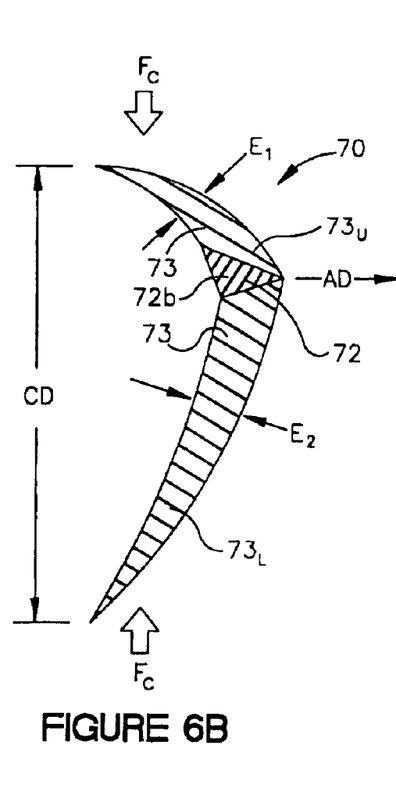
FIG. 6B shows the sidewall wedge insert of FIG. 6A loaded in radial compression.

FIG. 6A shows in schematic cross-sectional view another approach to the same challenge of providing a runflat tire that gives a comfortable ride during normal inflated operation while providing good sidewall rigidity during runflat operation. In FIG. 6A, a composite-wedge insert 70 is shown incorporating a single "restrictor" 72 made of relatively rigid elastomer and having a triangular cross section disposed within the wedge insert. The wedge insert 70 is made primarily of a flexible, low-hysteresis material of the sort typically used in wedge inserts. The restrictor 72 is positioned with the "apex" 72a on the surface 70a of the wedge insert 70 that lies axially outward from the equatorial plane of the tire, while the base 72b forms a portion of the surface 70b that lies axially inward from the surface 70a toward the equatorial plane. FIG. 6B shows the effect of the more rigid material of restrictor 72 upon the wedge insert 70 when the wedge insert is subjected to a compressive force $F_C$. Such radially directed compressive loading induces deformation of the wedge insert member 70 such that the compression distance CD remains larger than were the more rigid material of restrictor 72 not present. At the same time, the thicknesses $E_1$ (of the upper portion $73_U$ of the wedge insert 70) and $E_2$ (of the lower portion $73_L$ of the wedge insert) are constrained from the greater magnitudes of expansion they would otherwise undergo in the absence of the rigid element 73, which constrains lateral expansion of the adjacent more flexible material of $73_U$ and $73_L$. This constraint on the lateral expansions as characterized by thicknesses $E_1, E_2$ would, of course, be greatest in those portions $73_U$ and $73_L$ that are most immediately adjacent to the rigid element 73.

Figure 7:
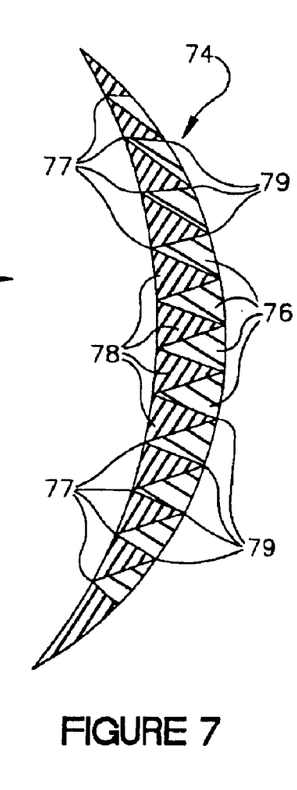
FIG. 7 is a cross-sectional view of the wedge insert design principle demonstrated in FIGS. 6A and 6B.

FIG. 7 shows, in schematic cross-sectional view, a wedge insert 74 in which the principle demonstrated in FIGS. 6A and 6B is brought to bear in a setting of alternating regions of flexible material 76 and stiffer material 78. FIG. 7 shows, therefore, a specific application of the general principle demonstrated in FIGS. 6A and 6B.

Referring to the embodiment of FIG. 7, the wedge insert 74 comprises radially alternating regions of flexible sections 76 and stiffer sections 78. The respective sections 76,78 are generally triangular in cross-section and circumferentially disposed within the circumferentially disposed wedge insert 74. They are radially alternating in the sense that the sections alternate in the tire's radial direction. One vertex 77 of each of the generally triangular, flexible section, 76 points (or is oriented generally axially inward) towards the tire's equatorial plane. One vertex 79 of each of the circumferentially disposed and generally triangular stiffer sections 78 points outward (away from the tire's equatorial plane). The generally triangular flexible, low-hysteresis sections 76 have a hardness of between about 45 and about 70 on the Shore A scale. The generally triangular stiffer sections 78 have a hardness that can be anywhere from slightly stiffer than flexible section 76 (such as elastomer) to totally rigid (such as metal). The number of rigid regions 78 and flexible regions 76 and the specific shapes of the generally triangular cross-sectioned regions can be varied in such a way as to tailor the tire's properties to its specific intended uses, such as on passenger vehicles or light trucks.

The arrangement of the triangular regions 76,78 of the wedge insert 74 shown in FIG. 7 affords two modes of action that provide benefit to runflat tire designs. One mode of action is the constraint upon lateral expansion of the wedge insert 74, as described in relation to the layered composite design shown in FIG. 5 and mentioned in relation to the dimensions $E_1, E_2$ in the description of FIG. 6B. The other effect is described in reference to FIGS. 8A and 8B.

Figure 8A:
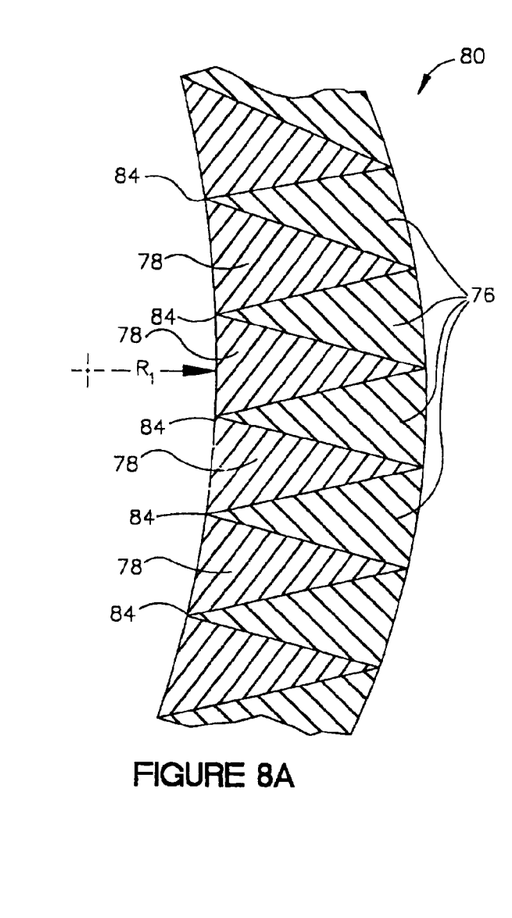
FIG. 8A is an enlarged cross-sectional detailed view of the wedge insert portion shown in FIG. 7.
Figure 8B:
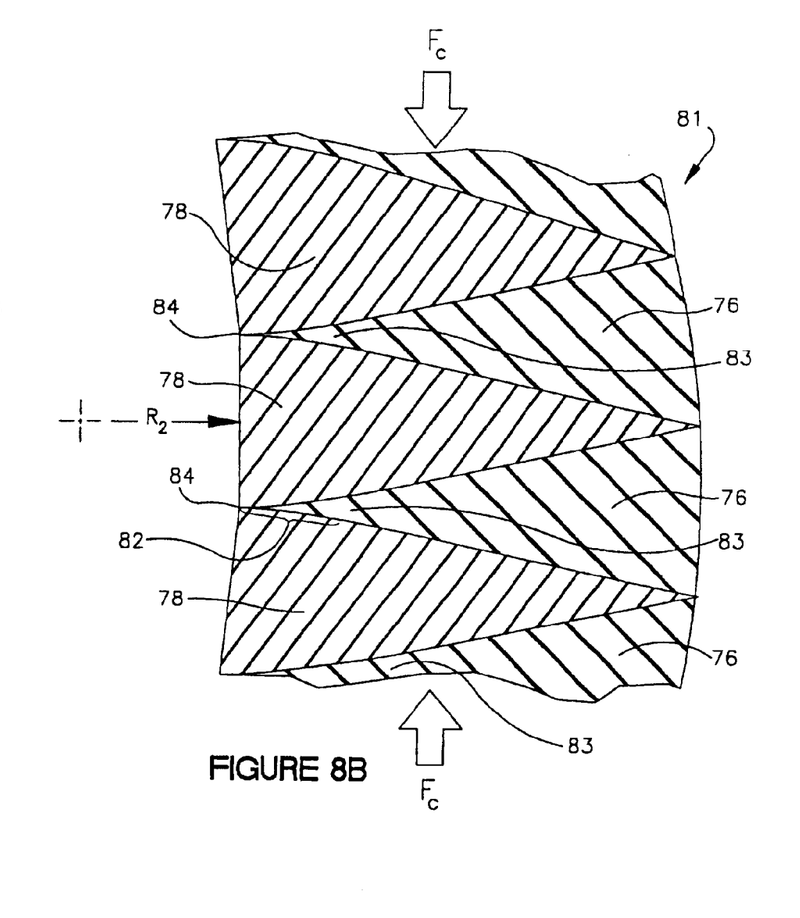
FIG. 8B shows an enlarged wedge insert portion of FIG. 8A in compression.

FIG. 8A shows an enlarged segment 80 of the wedge insert 74 shown in FIG. 7. The enlarged segment 80 contains generally triangularly shaped stiffer restrictors 78 interspersed with generally triangularly shaped more-flexible, low-hysteresis regions 76. The segment 80 is loaded in radially directed compression, and has a radius of curvature of $R_1$. The rigid restrictors 78 make contact with each other at the points 84. During runflat operation, the shape of segment 80 changes. FIG. 8B shows a portion 81 of the segment 80 shown in FIG. 8A. The portion 81 is loaded in radially directed compression by the force vectors $F_C$ which arise in the sidewall portions that are most adjacent to the ground-contacting portion of the tire's tread when the tire is uninflated. The radius of curvature $R_2$ shown in FIG. 8B is therefore less than $R_1$ shown in FIG. 8A, due to the bending effect of the compression load. In FIG. 8B the rigid restrictors 78 are shown as deformed along the region 82 due to the bending effects of the compressive force $F_C$. The effect of the bending induced by the compressive force $F_C$ is therefore such as to bring the rigid restrictor portions 78 into closer contact in the locations that are adjacent to their initial points of contact 84. The region denoted by 82 becomes deformed in compression as the vortex portions 83 of the less rigid sections 76 that are closest to the contact points 84 become compressed.

Thus, the net effect of the compression-induced bending of the wedge insert embodiment 74 shown in FIG. 7 is such that as the compression-related bending moment increases, the region 82 widens (lengthens) in a way that corresponds to a compressive force upon the vertex regions 83 of the flexible material 76. In other words, as the compression force increases, the regions 82 of the restrictors 78 that are closest to the locations 84 approach one another in a way that increases the area of regions 82 that are adjacent to the compressed vertex portion 83 of the flexible regions 76.

Preferred Embodiment

Figure 9:
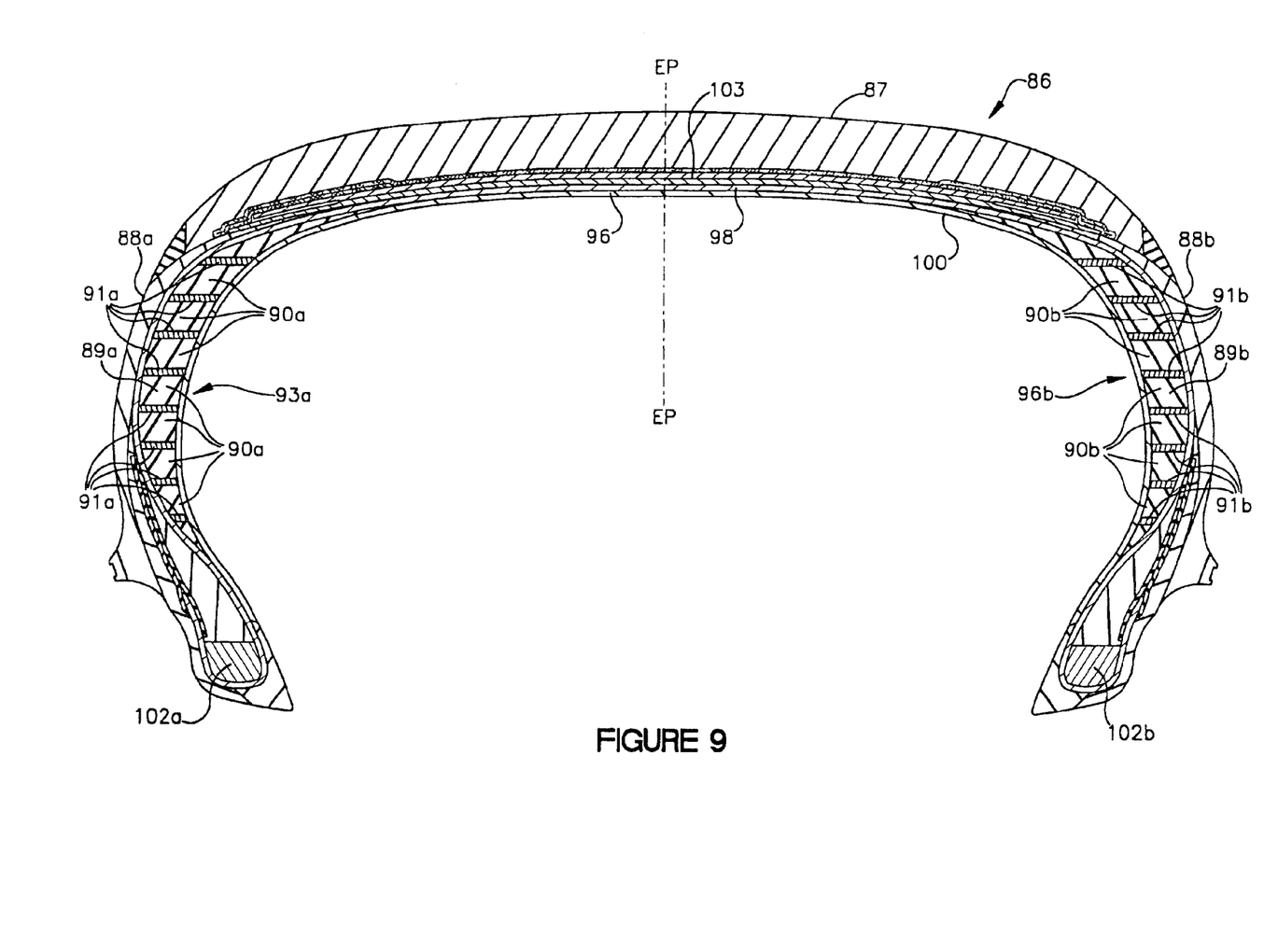
FIG. 9 is a cross-sectional view of one embodiment of the present invention.

Referring to FIG. 9, there is illustrated in cross-sectional view one embodiment of the invention in a runflat radial ply pneumatic tire 86 having a tread 87, a carcass 96 including a radial ply structure 98, an inner liner 100, two inextensible annular beads 102a,102b and two sidewalls 88a,88b. A belt structure 103 is located between the tread 87 and the carcass 96. Each sidewall 88a,88b of this radial ply runflat pneumatic tire 86 contains a single sidewall-reinforcing wedge insert 89a,89b, respectively, comprising radially alternating regions 90a,90b of flexible, low-hysteresis material separated by a multiplicity or at least one of more rigid (stiffer) layers 91a,91b, respectively. The plurality of radially-layered, circumferentially disposed regions (90a,90b) are separated by the plurality of circumferentially disposed layers (91a,91b) of a material that is stiffer than the material of the regions 90a,90b.

The tire 86 affords flexible sidewalls and good riding comfort under normal-inflated operation while also providing highly stiff sidewall reinforcement during runflat operation. The wedge insert, 89a,89b, while shown incorporating the embodiment shown in FIG. 5 can be substituted with the wedge insert embodiment shown in FIG. 7.

Alternative Preferred Embodiment

Figure 10:
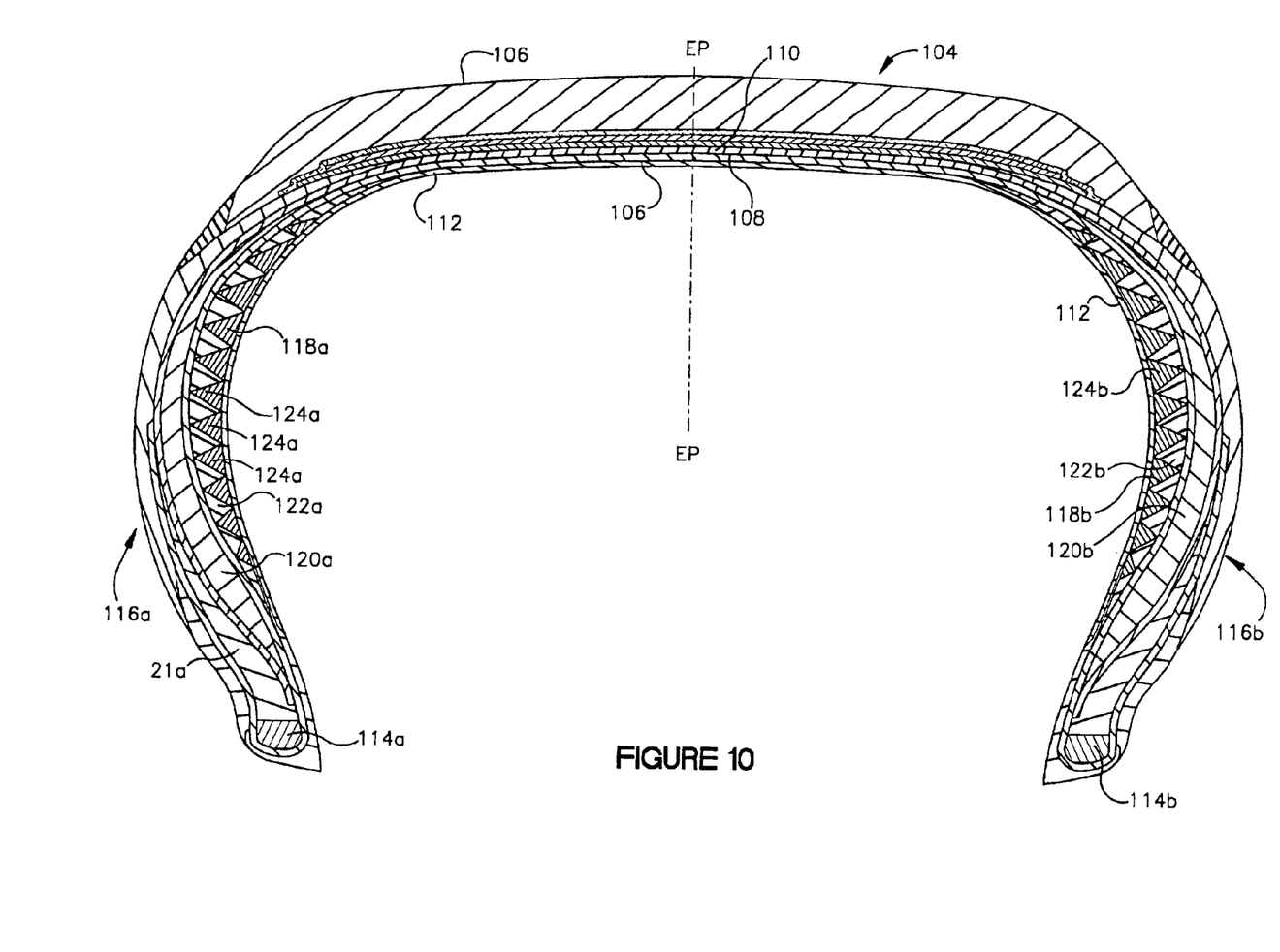
FIG. 10 is a cross-sectional view of a second embodiment of the present invention.

Referring to FIG. 10, there is illustrated in cross-sectional view another embodiment of the invention in a runflat radial ply tire 104 having a tread 106, a carcass 116 including a radial ply structure 110, an inner liner 112, two inextensible annular beads 114a,114b and two sidewalls 116a,116b. A belt structure 117 is located between the tread 106 and the carcass 108. Each sidewall 116a,116b of this radial ply runflat tire 104 contains a first inner sidewall-reinforcing wedge insert 118a,118b (like 74 of FIG. 6B), respectively and a second outwardly disposed sidewall wedge insert 120a,120b. Each of the first sidewall-reinforcing wedge inserts 118a,118b comprises radially alternating and generally triangular shaped regions 122a, 122b (like 76) of flexible, low-hysteresis material separated by a multiplicity of generally triangular shaped regions 124a,124b (like 78), respectively, of stiffer material. The generally triangularly shaped regions 122a,122b of flexible, low-hysteresis material and the regions 124a,124b of stiffer material are disposed such that one vertex of each flexible, low-hysteresis triangular region 122a,122b is oriented generally axially inward toward the tire's equatorial plane EP while one vertex of each generally triangularly shaped intervening region 124a,124b of rigid material is oriented generally axially outward away from the tire's equatorial plane. The tire 104 affords flexible sidewalls and good riding comfort under normal-inflated operation while also providing highly stiff sidewall reinforcement during runflat operation. While wedge inserts 118a,118b are shown as the embodiment shown in FIG. 7, it is within the scope of the present invention to substitute wedge inserts of the type shown in FIG. 5.

While, in this embodiment, the inner inserts 118a,118b are composite (i.e. of layered flexible regions 122a,122b and stiffer regions 124a,124b) and the outer inserts 120a,120b are not composites, it is within the scope of this invention for the outer inserts to be composites and the inner inserts not to be composites, or for both the inner inserts and the outer inserts to be composites.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A pneumatic radial ply runflat tire having a tread, a carcass including a radial ply structure and two sidewalls each being reinforced by at least one reinforcing wedge inserts, the tire characterized by:

the at least one reinforcing wedge insert being constructed of two or more different materials providing a structural moment of inertia that increases with increased strain in the sidewalls;

characterized in that the least one reinforcing wedge insert in each sidewall, respectively, comprises a plurality of radially-layered, circumferentially disposed regions of a first flexible, low-hysteresis material separated by one or more circumferentially disposed layers of a second material being stiffer than the first material;

in which the radially-layered, circumferentially disposed regions of flexible, low-hysteresis material and the layers of a second stiffer material are both triangularly shaped in cross section.

2. The tire of claim 1 in which the radially alternating, circumferentially disposed triangularly shaped regions of flexible, low-hysteresis material and the intervening, circumferentially disposed, triangularly shaped layers of material are disposed such that one vertex of each triangularly shaped region of flexible, low-hysteresis material is oriented axially inward toward the tire's equatorial plane and another vertex of each circumferentially disposed, triangularly shaped alternating layers of stiffer material is oriented axially outward from the tire's equatorial plane.

3. The tire of claim 2 in which the regions of flexible, low-hysteresis material are selected of a material having a hardness of between 45 and 70 on the Shore A Scale.

4. The tire of claim 3 in which the layers of stiffer material are selected of a material having a hardness that is between slightly more than that of the flexible low-hysteresis material to totally rigid.

5. The tire of claim 4 further including a second reinforcing wedge insert disposed axially outward from the at least one wedge insert in each sidewall, respectively.

6. The tire of claim 1 further characterized in that the regions of flexible, low-hysteresis material have a hardness of between 45 and 70 on the Shore A scale, and the layers of stiffer material have a hardness that is between slightly more than that of the flexible low-hysteresis material to totally rigid.

7. The tire of claim 1 further characterized in that the tire includes a second reinforcing wedge insert disposed axially outward from the at least one wedge insert in each sidewall, respectively.

8. The tire of claim 1 further characterized in that the first flexible, low-hysteresis material comprises elastomer, and the second material comprises a relatively rigid material selected the group including fiber reinforced elastomer, thermoplastic with or without metal reinforcement, metal and metal alloy.

9. The tire of claim 8, the at least one reinforcing wedge insert being constructed of two or more different materials providing a structural moment of inertia that increases with increased strain in the sidewalls.

10. A pneumatic radial ply runflat tire having a tread a carcass including a radial ply structure and two sidewalls each being reinforced by at least one reinforcing wedge inserts, the tire characterized in that the least one reinforced wedge insert in each sidewall, respectively comprises a plurality of radial-layered, circumferentially disposed regions of a first flexible, low-hysteresis material separated by one or more circumferentially disposed layers of a second material being stiffer than the first material;

in which the radially-layered, circumferentially disposed regions of flexible, low-hysteresis material and the layers of a second stiffer material are both triangularly shaped in cross section.

11. The tire of claim 10 in which the radially alternating, circumferentially disposed triangularly shaped regions of flexible, low-hysteresis material and the intervening, circumferentially disposed, triangularly shaped layers of material are disposed such that one vertex of each triangularly shaped region of flexible, low-hysteresis material is oriented axially inward toward the tire's equatorial plane and another vertex of each circumferentially disposed, triangularly shaped alternating layers of stiffer material is oriented axially outward from the tire's equatorial plane.

12. The tire of claim 11 in which the regions of flexible, low-hysteresis material are selected of a maternal having a hardness of between 45 and 70 on the Shore A Scale.

13. The tire of claim 12 in which the layers of stiffer material are selected of a material having a hardness that is between slightly more than that of the flexible low-hysteresis material to totally rigid.

14. The tire of claim 13 further including a second reinforcing wedge insert disposed axially outward from the at least one wedge insert in ach sidewall, respectively.

15. The tire of claim 10 further characterized in that the regions of flexible, low-hysteresis material have a hardness of between 45 and 70 on the Shore A scale, and the layers of stiffer material have a hardness that is between slightly more than that of the flexible low-hysteresis material to totally rigid.

16. The tire of claim 10 further characterized in that the tire includes a second reinforcing wedge insert disposed axially outward from the at least one wedge insert in each sidewall, respectively.

17. The tire of claim 10 further characterized in that the first flexible, low-hysteresis material comprises elastomer, and the second material comprises a relatively rigid material selected the group including fiber reinforced elastomer, thermoplastic with or without metal reinforcement, metal and metal alloy.

* * * * *